US010991395B1

(12) United States Patent
Shaburova et al.

(10) Patent No.: US 10,991,395 B1
(45) Date of Patent: *Apr. 27, 2021

(54) METHOD FOR REAL TIME VIDEO PROCESSING INVOLVING CHANGING A COLOR OF AN OBJECT ON A HUMAN FACE IN A VIDEO

(71) Applicant: Snap Inc., Santa Monica, CA (US)

(72) Inventors: Elena Shaburova, Castro Valley, CA (US); Yurii Monastyrshyn, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/277,750

(22) Filed: Feb. 15, 2019

Related U.S. Application Data

(63) Continuation of application No. 15/208,973, filed on Jul. 13, 2016, now Pat. No. 10,255,948, which is a
(Continued)

(51) Int. Cl.
*G06K 9/00* (2006.01)
*G11B 27/031* (2006.01)
(Continued)

(52) U.S. Cl.
CPC ............ *G11B 27/031* (2013.01); *G06F 3/011* (2013.01); *G06K 9/00261* (2013.01);
(Continued)

(58) Field of Classification Search
None
See application file for complete search history.

(56) References Cited

U.S. PATENT DOCUMENTS

| 4,888,713 A | 12/1989 | Falk |
| 5,359,706 A | 10/1994 | Sterling |

(Continued)

FOREIGN PATENT DOCUMENTS

| CA | 2887596 A1 | 7/2015 |
| CN | 109863532 A | 6/2019 |

(Continued)

OTHER PUBLICATIONS

"U.S. Appl. No. 14/114,124, Response filed Oct. 5, 2016 to Final Office Action dated May 5, 2016", 14 pgs.
(Continued)

*Primary Examiner* — Feng Niu
(74) *Attorney, Agent, or Firm* — Schwegman Lundberg & Woessner, P.A.

(57) ABSTRACT

A computer-implemented method for real time video processing for changing a color of an object in a video, the method being performed in connection with a computerized system comprising a processing unit and a memory, the method comprising: providing an object in the video that at least partially and at least occasionally is presented in frames of the video; detecting the object in the video, wherein said detection comprises detecting feature reference points of the object; tracking the detected object in the video, wherein the tracking comprises creating a mesh that is based on the detected feature reference points of the object and aligning the mesh to the object in each frame; generating a set of node points on the created mesh based on a request for changing color, the set of node points defining an area the color of which is to be changed; and transforming the frames of the video in such way that the object's color is changed within the defined area when the object is presented in frames of the video.

20 Claims, 7 Drawing Sheets

Related U.S. Application Data continuation of application No. 14/325,477, filed on Jul. 8, 2014, now Pat. No. 9,396,525.

(60) Provisional application No. 61/936,016, filed on Feb. 5, 2014.

(51) Int. Cl.

| | | |
|---|---|---|
| *G06K 9/46* | (2006.01) | |
| *G06K 9/52* | (2006.01) | |
| *G06T 13/40* | (2011.01) | |
| *G06T 17/20* | (2006.01) | |
| *G06T 11/00* | (2006.01) | |
| *G06T 5/00* | (2006.01) | |
| *G06T 7/90* | (2017.01) | |
| *G06T 7/246* | (2017.01) | |
| *G06T 7/33* | (2017.01) | |
| *G06F 3/01* | (2006.01) | |
| *G06T 11/60* | (2006.01) | |
| *H04N 5/262* | (2006.01) | |
| *H04N 9/79* | (2006.01) | |
| *G06T 19/20* | (2011.01) | |
| *G06N 20/00* | (2019.01) | |

(52) U.S. Cl.
CPC ..... *G06K 9/00268* (2013.01); *G06K 9/00281* (2013.01); *G06K 9/00302* (2013.01); *G06K 9/00335* (2013.01); *G06K 9/00711* (2013.01); *G06K 9/00744* (2013.01); *G06K 9/46* (2013.01); *G06K 9/4652* (2013.01); *G06K 9/4661* (2013.01); *G06K 9/52* (2013.01); *G06N 20/00* (2019.01); *G06T 5/005* (2013.01); *G06T 7/246* (2017.01); *G06T 7/251* (2017.01); *G06T 7/33* (2017.01); *G06T 7/90* (2017.01); *G06T 11/001* (2013.01); *G06T 11/60* (2013.01); *G06T 13/40* (2013.01); *G06T 17/20* (2013.01); *G06T 19/20* (2013.01); *H04N 5/262* (2013.01); *H04N 9/79* (2013.01); *G06K 2009/4666* (2013.01); *G06T 2207/10016* (2013.01); *G06T 2207/10021* (2013.01); *G06T 2207/10024* (2013.01); *G06T 2207/20036* (2013.01); *G06T 2207/30201* (2013.01)

(56) References Cited

U.S. PATENT DOCUMENTS

| | | | |
|---|---|---|---|
| 5,479,603 A | 12/1995 | Stone et al. | |
| 5,880,731 A | 3/1999 | Liles et al. | |
| 6,023,270 A | 2/2000 | Brush, II et al. | |
| 6,038,295 A | 3/2000 | Mattes | |
| 6,223,165 B1 | 4/2001 | Lauffer | |
| 6,252,576 B1 * | 6/2001 | Nottingham | G06T 3/4007 345/643 |
| H2003 H | 11/2001 | Minner | |
| 6,621,939 B1 | 9/2003 | Negishi et al. | |
| 6,768,486 B1 | 7/2004 | Szabo et al. | |
| 6,772,195 B1 | 8/2004 | Hatlelid et al. | |
| 6,807,290 B2 * | 10/2004 | Liu | G06K 9/00201 375/E7.084 |
| 6,842,779 B1 | 1/2005 | Nishizawa | |
| 6,897,977 B1 | 5/2005 | Bright | |
| 6,980,909 B2 | 12/2005 | Root et al. | |
| 7,034,820 B2 | 4/2006 | Urisaka et al. | |
| 7,039,222 B2 | 5/2006 | Simon et al. | |
| 7,050,078 B2 | 5/2006 | Dempski | |
| 7,119,817 B1 | 10/2006 | Kawakami | |
| 7,167,519 B2 | 1/2007 | Comaniciu et al. | |
| 7,173,651 B1 | 2/2007 | Knowles | |
| 7,212,656 B2 | 5/2007 | Liu et al. | |
| 7,227,567 B1 | 6/2007 | Beck et al. | |
| 7,239,312 B2 | 7/2007 | Urisaka et al. | |
| 7,342,587 B2 | 3/2008 | Danzig et al. | |
| 7,411,493 B2 | 8/2008 | Smith | |
| 7,415,140 B2 | 8/2008 | Nagahashi et al. | |
| 7,468,729 B1 | 12/2008 | Levinson | |
| 7,535,890 B2 | 5/2009 | Rojas | |
| 7,564,476 B1 | 7/2009 | Coughlan et al. | |
| 7,636,755 B2 | 12/2009 | Blattner et al. | |
| 7,639,251 B2 | 12/2009 | Gu et al. | |
| 7,697,787 B2 | 4/2010 | Illsley | |
| 7,710,608 B2 | 5/2010 | Takahashi | |
| 7,775,885 B2 | 8/2010 | Van Luchene et al. | |
| 7,812,993 B2 | 10/2010 | Bright | |
| 7,830,384 B1 | 11/2010 | Edwards et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 7,945,653 B2 | 5/2011 | Zuckerberg et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,131,597 B2 | 3/2012 | Hudetz | |
| 8,146,005 B2 | 3/2012 | Jones et al. | |
| 8,151,191 B2 | 4/2012 | Nicol | |
| 8,199,747 B2 | 6/2012 | Rojas et al. | |
| 8,230,355 B1 | 7/2012 | Bauermeister et al. | |
| 8,253,789 B2 | 8/2012 | Aizaki et al. | |
| 8,295,557 B2 | 10/2012 | Wang et al. | |
| 8,296,456 B2 | 10/2012 | Klappert | |
| 8,314,842 B2 * | 11/2012 | Kudo | H04N 5/2171 348/208.4 |
| 8,332,475 B2 | 12/2012 | Rosen et al. | |
| 8,335,399 B2 * | 12/2012 | Gyotoku | H04N 5/232 382/275 |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,717,465 B2 * | 5/2014 | Ning | G06T 5/001 348/251 |
| 8,718,333 B2 | 5/2014 | Wolf et al. | |
| 8,724,622 B2 | 5/2014 | Rojas | |
| 8,743,210 B2 * | 6/2014 | Lin | H04N 17/004 348/175 |
| 8,761,497 B2 | 6/2014 | Berkovich et al. | |
| 8,766,983 B2 | 7/2014 | Marks et al. | |
| 8,810,513 B2 | 8/2014 | Ptucha et al. | |
| 8,810,696 B2 * | 8/2014 | Ning | G06T 5/001 348/251 |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,874,677 B2 | 10/2014 | Rosen et al. | |
| 8,890,926 B2 | 11/2014 | Tandon et al. | |
| 8,892,999 B2 | 11/2014 | Nims et al. | |
| 8,909,679 B2 | 12/2014 | Root et al. | |
| 8,924,250 B2 | 12/2014 | Bates et al. | |

(56) References Cited

U.S. PATENT DOCUMENTS

| | | | |
|---|---|---|---|
| 8,929,614 B2 * | 1/2015 | Oicherman | G06T 7/75 382/117 |
| 8,934,665 B2 | 1/2015 | Kim et al. | |
| 8,958,613 B2 | 2/2015 | Kondo et al. | |
| 8,963,926 B2 | 2/2015 | Brown et al. | |
| 8,989,786 B2 | 3/2015 | Feghali | |
| 8,995,433 B2 | 3/2015 | Rojas | |
| 9,032,314 B2 | 5/2015 | Mital et al. | |
| 9,040,574 B2 | 5/2015 | Wang et al. | |
| 9,055,416 B2 | 6/2015 | Rosen et al. | |
| 9,086,776 B2 | 7/2015 | Ye et al. | |
| 9,100,806 B2 | 8/2015 | Rosen et al. | |
| 9,100,807 B2 | 8/2015 | Rosen et al. | |
| 9,105,014 B2 | 8/2015 | Collet et al. | |
| 9,191,776 B2 | 11/2015 | Root et al. | |
| 9,204,252 B2 | 12/2015 | Root et al. | |
| 9,232,189 B2 | 1/2016 | Shaburov et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,364,147 B2 | 6/2016 | Wakizaka et al. | |
| 9,378,576 B2 | 6/2016 | Bouaziz et al. | |
| 9,396,525 B2 | 7/2016 | Shaburova et al. | |
| 9,402,057 B2 | 7/2016 | Kaytaz et al. | |
| 9,412,192 B2 | 8/2016 | Mandel et al. | |
| 9,443,227 B2 | 9/2016 | Evans et al. | |
| 9,460,541 B2 | 10/2016 | Li et al. | |
| 9,489,661 B2 | 11/2016 | Evans et al. | |
| 9,489,760 B2 | 11/2016 | Li et al. | |
| 9,491,134 B2 | 11/2016 | Rosen et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,565,362 B2 * | 2/2017 | Kudo | H04N 5/23267 |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal et al. | |
| 9,898,849 B2 | 2/2018 | Du et al. | |
| 9,911,073 B1 | 3/2018 | Spiegel et al. | |
| 9,928,874 B2 | 3/2018 | Shaburova | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,255,948 B2 | 4/2019 | Shaburova et al. | |
| 10,262,250 B1 | 4/2019 | Spiegel et al. | |
| 10,283,162 B2 | 5/2019 | Shaburova et al. | |
| 10,362,219 B2 | 7/2019 | Wilson et al. | |
| 10,438,631 B2 | 10/2019 | Shaburova et al. | |
| 10,475,225 B2 | 11/2019 | Park et al. | |
| 10,504,266 B2 | 12/2019 | Blattner et al. | |
| 10,566,026 B1 | 2/2020 | Shaburova | |
| 10,573,048 B2 | 2/2020 | Ni et al. | |
| 10,586,570 B2 | 3/2020 | Shaburova | |
| 10,657,701 B2 | 5/2020 | Osman et al. | |
| 2002/0012454 A1 | 1/2002 | Liu et al. | |
| 2002/0067362 A1 | 6/2002 | Agostino Nocera et al. | |
| 2002/0169644 A1 | 11/2002 | Greene | |
| 2003/0107568 A1 | 6/2003 | Urisaka et al. | |
| 2003/0228135 A1 | 12/2003 | Illsley | |
| 2004/0076337 A1 | 4/2004 | Nishida | |
| 2004/0119662 A1 | 6/2004 | Dempski | |
| 2004/0130631 A1 | 7/2004 | Suh | |
| 2004/0233223 A1 | 11/2004 | Schkolne et al. | |
| 2005/0046905 A1 | 3/2005 | Aizaki et al. | |
| 2005/0117798 A1 | 6/2005 | Patton et al. | |
| 2005/0128211 A1 | 6/2005 | Berger et al. | |
| 2005/0162419 A1 | 7/2005 | Kim et al. | |
| 2005/0180612 A1 | 8/2005 | Nagahashi et al. | |
| 2005/0190980 A1 | 9/2005 | Bright | |
| 2005/0202440 A1 | 9/2005 | Fletterick et al. | |
| 2005/0206610 A1 | 9/2005 | Cordelli | |
| 2005/0220346 A1 | 10/2005 | Akahori | |
| 2005/0238217 A1 * | 10/2005 | Enomoto | G06K 9/00597 382/128 |
| 2006/0170937 A1 | 8/2006 | Takahashi | |
| 2006/0227997 A1 | 10/2006 | Au et al. | |
| 2006/0242183 A1 | 10/2006 | Niyogi et al. | |
| 2006/0294465 A1 | 12/2006 | Ronen et al. | |
| 2007/0013709 A1 | 1/2007 | Charles et al. | |
| 2007/0087352 A9 | 4/2007 | Fletterick et al. | |
| 2007/0113181 A1 | 5/2007 | Blattner et al. | |
| 2007/0140556 A1 * | 6/2007 | Willamowski | G06K 9/0061 382/167 |
| 2007/0159551 A1 * | 7/2007 | Kotani | H04N 5/367 348/349 |
| 2007/0168863 A1 | 7/2007 | Blattner et al. | |
| 2007/0176921 A1 | 8/2007 | Iwasaki et al. | |
| 2007/0258656 A1 | 11/2007 | Aarabi et al. | |
| 2007/0268312 A1 | 11/2007 | Marks et al. | |
| 2008/0158222 A1 | 7/2008 | Li et al. | |
| 2008/0184153 A1 | 7/2008 | Matsumura et al. | |
| 2008/0187175 A1 | 8/2008 | Kim et al. | |
| 2008/0204992 A1 | 8/2008 | Swenson et al. | |
| 2008/0212894 A1 | 9/2008 | Demirli et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0177981 A1 | 7/2010 | Wang et al. | |
| 2010/0185963 A1 | 7/2010 | Slik et al. | |
| 2010/0188497 A1 | 7/2010 | Aizaki et al. | |
| 2010/0203968 A1 | 8/2010 | Gill et al. | |
| 2010/0227682 A1 | 9/2010 | Reville et al. | |
| 2011/0018875 A1 | 1/2011 | Arahari et al. | |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0202598 A1 | 8/2011 | Evans et al. | |
| 2011/0239136 A1 | 9/2011 | Goldman et al. | |
| 2011/0273620 A1 | 11/2011 | Berkovich et al. | |
| 2012/0106806 A1 | 5/2012 | Folta et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2012/0136668 A1 | 5/2012 | Kuroda | |
| 2012/0144325 A1 | 6/2012 | Mital et al. | |
| 2012/0167146 A1 | 6/2012 | Incorvia | |
| 2012/0209924 A1 | 8/2012 | Evans et al. | |
| 2012/0306853 A1 | 12/2012 | Wright et al. | |
| 2013/0004096 A1 | 1/2013 | Goh et al. | |
| 2013/0103760 A1 | 4/2013 | Golding et al. | |
| 2013/0114867 A1 | 5/2013 | Kondo et al. | |
| 2013/0190577 A1 | 7/2013 | Brunner et al. | |

(56) References Cited

U.S. PATENT DOCUMENTS

| | | | |
|---|---|---|---|
| 2013/0201105 A1 | 8/2013 | Ptucha et al. |
| 2013/0201187 A1 | 8/2013 | Tong et al. |
| 2013/0208129 A1 | 8/2013 | Stenman |
| 2013/0216094 A1 | 8/2013 | Delean |
| 2013/0235086 A1 | 9/2013 | Otake |
| 2013/0249948 A1 | 9/2013 | Reitan |
| 2013/0257877 A1 | 10/2013 | Davis |
| 2013/0287291 A1 | 10/2013 | Cho |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0228668 A1 | 8/2014 | Wakizaka et al. |
| 2015/0097834 A1 | 4/2015 | Ma et al. |
| 2015/0116448 A1 | 4/2015 | Gottlieb |
| 2015/0131924 A1 | 5/2015 | He et al. |
| 2015/0145992 A1 | 5/2015 | Traff |
| 2015/0163416 A1 | 6/2015 | Nevatie |
| 2015/0195491 A1 | 7/2015 | Shaburov et al. |
| 2015/0206349 A1 | 7/2015 | Rosenthal et al. |
| 2015/0213604 A1 | 7/2015 | Li et al. |
| 2015/0220252 A1 | 8/2015 | Mital et al. |
| 2015/0221069 A1 | 8/2015 | Shaburova et al. |
| 2015/0221118 A1 | 8/2015 | Shaburova |
| 2015/0221136 A1 | 8/2015 | Shaburova et al. |
| 2015/0221338 A1 | 8/2015 | Shaburova et al. |
| 2015/0222821 A1 | 8/2015 | Shaburova |
| 2016/0134840 A1 | 5/2016 | Mcculloch |
| 2016/0234149 A1 | 8/2016 | Tsuda et al. |
| 2016/0322079 A1 | 11/2016 | Shaburova et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0364810 A1 | 12/2018 | Parshionikar |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2020/0160886 A1 | 5/2020 | Shaburova |

FOREIGN PATENT DOCUMENTS

| | | |
|---|---|---|
| CN | 110168478 A | 8/2019 |
| EP | 2184092 A2 | 5/2010 |
| JP | 2001230801 A | 8/2001 |
| JP | 5497931 B2 | 3/2014 |
| KR | 100853122 B1 | 8/2008 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 10/2006 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 14/314,312, Final Office Action dated Apr. 12, 2017", 34 pgs.

"U.S. Appl. No. 14/314,312, Final Office Action dated May 5, 2016", 28 pgs.

"U.S. Appl. No. 14/314,312, Final Office Action dated May 10, 2018", 32 pgs.

"U.S. Appl. No. 14/314,312, Non Final Office Action dated Aug. 30, 2017", 32 pgs.

"U.S. Appl. No. 14/314,312, Non Final Office Action dated Oct. 17, 2016", 33 pgs.

"U.S. Appl. No. 14/314,312, Non Final Office Action dated Nov. 5, 2015", 26 pgs.

"U.S. Appl. No. 14/314,312, Non Final Office Action dated Nov. 27, 2018", 29 pgs.

"U.S. Appl. No. 14/314,312, Response filed Mar. 17, 2017 to Non Final Office Action dated Oct. 17, 2016", 12 pgs.

"U.S. Appl. No. 14/314,312, Response filed Jan. 28, 2019 to Non Final Office Action dated Nov. 27, 2018", 10 pgs.

"U.S. Appl. No. 14/314,312, Response filed Feb. 28, 2018 to Non Final Office Action dated Aug. 30, 2017", 13 pgs.

"U.S. Appl. No. 14/314,312, Response filed Apr. 5, 2016 to Non Final Office Action dated Nov. 5, 2015", 13 pgs.

"U.S. Appl. No. 14/314,312, Response filed Aug. 14, 2017 to Final Office Action dated Apr. 12, 2017", 16 pgs.

"U.S. Appl. No. 14/314,312, Response filed Sep. 6, 2018 to Final Office Action dated May 10, 2018", 12 pgs.

"U.S. Appl. No. 14/314,312, Response filed Oct. 5, 2016 to Final Office Action dated May 5, 2016", 12 pgs.

"U.S. Appl. No. 14/314,324, Advisory Action dated Sep. 21, 2017", 4 pgs.

"U.S. Appl. No. 14/314,324, Final Office Action dated May 3, 2017", 33 pgs.

"U.S. Appl. No. 14/314,324, Final Office Action dated May 5, 2016", 24 pgs.

"U.S. Appl. No. 14/314,324, Non Final Office Action dated Oct. 14, 2016", 26 pgs.

"U.S. Appl. No. 14/314,324, Non Final Office Action dated Nov. 5, 2015", 23 pgs.

"U.S. Appl. No. 14/314,324, Notice of Allowance dated Nov. 8, 2017", 7 pgs.

"U.S. Appl. No. 14/314,324, Response filed Feb. 14, 2017 to Non Final Office Action dated Oct. 14, 2016", 19 pgs.

"U.S. Appl. No. 14/314,324, Response filed Apr. 5, 2016 to Non Final Office Action dated Nov. 5, 2015", 15 pgs.

"U.S. Appl. No. 14/314,324, Response filed Sep. 1, 2017 to Final Office Action dated May 3, 2017", 10 pgs.

"U.S. Appl. No. 14/314,324, Response filed Oct. 5, 2016 to Final Office Action dated May 5, 2016", 14 pgs.

"U.S. Appl. No. 14/314,324, Response filed Nov. 3, 2017 to Advisory Action dated Sep. 21, 2017", 11 pgs.

"U.S. Appl. No. 14/314,334, Examiner Interview Summary dated Apr. 28, 2017", 3 pgs.

"U.S. Appl. No. 14/314,334, Examiner Interview Summary dated Nov. 26, 2018", 3 pgs.

"U.S. Appl. No. 14/314,334, Final Office Action dated May 16, 2016", 43 pgs.

"U.S. Appl. No. 14/314,334, Final Office Action dated May 31, 2018", 38 pgs.

"U.S. Appl. No. 14/314,334, Final Office Action dated Jul. 12, 2017", 40 pgs.

"U.S. Appl. No. 14/314,334, Non Final Office Action dated Jan. 22, 2018", 35 pgs.

"U.S. Appl. No. 14/314,334, Non Final Office Action dated Oct. 26, 2018", 39 pgs.

"U.S. Appl. No. 14/314,334, Non Final Office Action dated Nov. 13, 2015", 39 pgs.

"U.S. Appl. No. 14/314,334, Non Final Office Action dated Dec. 1, 2016", 45 pgs.

"U.S. Appl. No. 14/314,334, Notice of Allowance dated Sep. 19, 2017", 5 pgs.

(56) References Cited

OTHER PUBLICATIONS

"U.S. Appl. No. 14/314,334, Response filed Sep. 13, 2016 to Non Final Office Action dated Nov. 13, 2015", 20 pgs.
"U.S. Appl. No. 14/314,334, Response filed Apr. 23, 2018 to Non Final Office Action dated Jan. 22, 2018", 14 pgs.
"U.S. Appl. No. 14/314,334, Response filed May 20, 2017 to Non Final Office Action dated Dec. 1, 2016", 16 pgs.
"U.S. Appl. No. 14/314,334, Response filed Aug. 30, 2018 to Final Office Action dated May 31, 2018", 13 pgs.
"U.S. Appl. No. 14/314,334, Response filed Sep. 1, 2017 to Final Office Action dated Jul. 12, 2017", 12 pgs.
"U.S. Appl. No. 14/314,334, Response filed Oct. 17, 2016 to Final Office Action dated May 16, 2016", 16 pgs.
"U.S. Appl. No. 14/314,343, Final Office Action dated May 6, 2016", 19 pgs.
"U.S. Appl. No. 14/314,343, Final Office Action dated Aug. 15, 2017", 38 pgs.
"U.S. Appl. No. 14/314,343, Final Office Action dated Sep. 6, 2018", 43 pgs.
"U.S. Appl. No. 14/314,343, Non Final Office Action dated Apr. 19, 2018", 40 pgs.
"U.S. Appl. No. 14/314,343, Non Final Office Action dated Nov. 4, 2015", 14 pgs.
"U.S. Appl. No. 14/314,343, Non Final Office Action dated Nov. 17, 2016", 31 pgs.
"U.S. Appl. No. 14/314,343, Notice of Allowance dated Dec. 17, 2018", 5 pgs.
"U.S. Appl. No. 14/314,343, Response filed Feb. 15, 2018 to Final Office Action dated Aug. 15, 2017", 11 pgs.
"U.S. Appl. No. 14/314,343, Response filed Apr. 4, 2016 to Non Final Office Action dated Nov. 4, 2015", 10 pgs.
"U.S. Appl. No. 14/314,343, Response filed May 11, 2017 to Non Final Office Action dated Nov. 17, 2016", 13 pgs.
"U.S. Appl. No. 14/314,343, Response filed Jul. 19, 2018 to Non Final Office Action dated Apr. 19, 2018", 15 pgs.
"U.S. Appl. No. 14/314,343, Response filed Oct. 6, 2016 to Final Office Action dated May 6, 2016", 13 pgs.
"U.S. Appl. No. 14/314,343, Response filed Oct. 11, 2018 to Final Office Action dated Sep. 6, 2018", 11 pgs.
"U.S. Appl. No. 14/325,477, Non Final Office Action dated Oct. 9, 2015", 17 pgs.
"U.S. Appl. No. 14/325,477, Notice of Allowance dated Mar. 17, 2016", 5 pgs.
"U.S. Appl. No. 14/325,477, Response filed Feb. 9, 2016 to Non Final Office Action dated Oct. 9, 2015", 13 pgs.
"U.S. Appl. No. 15/208,973, Final Office Action dated May 10, 2018", 13 pgs.
"U.S. Appl. No. 15/208,973, Non Final Office Action dated Sep. 19, 2017", 17 pgs.
"U.S. Appl. No. 15/208,973, Notice of Allowability dated Feb. 21, 2019", 3 pgs.
"U.S. Appl. No. 15/208,973, Notice of Allowance dated Nov. 20, 2018", 14 pgs.
"U.S. Appl. No. 15/208,973, Preliminary Amendment filed Jan. 17, 2017", 9 pgs.
"U.S. Appl. No. 15/208,973, Response filed Sep. 5, 2018 to Final Office Action dated May 10, 2018", 10 pgs.
"Imatest", [Online] Retrieved from the internet on Jul. 10, 2015: <URL: https://web.archive.org/web/20150710000557/http://www.imatest.com/>, 3 pgs.
Ahlberg, Jorgen, "Candide-3: An Updated Parameterised Face", Image Coding Group, Dept. of Electrical Engineering, Linkoping University, SE, (Jan. 2001), 16 pgs.
Baxes, Gregory A., et al., "Digital Image Processing: Principles and Applications, Chapter 4", New York: Wiley, (1994), 88-91.
Chen, et al., "Manipulating, Deforming and Animating Sampled Object Representations", Computer Graphics Forum vol. 26, (2007), 824-852 pgs.
Dornaika, F, et al., "On Appearance Based Face and Facial Action Tracking", IEEE Trans. Circuits Syst. Video Technol. 16(9), (Sep. 2006), 1107-1124.
Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.
Milborrow, S, et al., "Locating facial features with an extended active shape model", Dept. of Electrical Engineering, University of Cape Town, South Africa, [Online] Retrieved from the internet: <URL: http://www.milbo.users.sonic.net>, (2008), 1-11.
"U.S. Appl. No. 14/314,312, Final Office Action dated Mar. 22, 2019", 28 pgs.
"U.S. Appl. No. 14/314,312, Response filed May 3, 2019 to Final Office Action dated Mar. 22, 2019", 11 pgs.
"U.S. Appl. No. 14/314,334, Appeal Brief filed Apr. 15, 2019", 19 pgs.
"U.S. Appl. No. 14/314,334, Final Office Action dated Feb. 15, 2019", 40 pgs.
"Bilinear interpolation", Wikipedia, [Online] retrieved from the internet: <https://web.archive.org/web/20110921104425/http://en.wikipedia.org/wiki/Bilinear_interpolation>, (Jan. 8, 2014), 3 pgs.
"U.S. Appl. No. 14/314,312, Advisory Action dated May 10, 2019", 3 pgs.
"U.S. Appl. No. 14/314,312, Non Final Office Action dated Jul. 5, 2019", 25 pgs.
"U.S. Appl. No. 14/314,334, Notice of Allowance dated Jul. 1, 2019", 9 pgs.
"U.S. Appl. No. 14/314,312, Appeal Brief filed Oct. 3, 2019", 14 pgs.
"U.S. Appl. No. 14/314,312, Notice of Allowability dated Jan. 7, 2020", 3 pgs.
"U.S. Appl. No. 14/314,312, Notice of Allowance dated Oct. 25, 2019", 9 pgs.
"U.S. Appl. No. 15/921,282, Notice of Allowance dated Oct. 2, 2019", 9 pgs.
"U.S. Appl. No. 16/298,721, Advisory Action dated May 12, 2020", 3 pgs.
"U.S. Appl. No. 16/298,721, Examiner Interview Summary dated Oct. 20, 2020", 3 pgs.
"U.S. Appl. No. 16/298,721, Final Office Action dated Mar. 6, 2020", 54 pgs.
"U.S. Appl. No. 16/298,721, Non Final Office Action dated Jul. 24, 2020", 80 pgs.
"U.S. Appl. No. 16/298,721, Non Final Office Action dated Oct. 3, 2019", 40 pgs.
"U.S. Appl. No. 16/298,721, Response filed Jan. 3, 2020 to Non Final Office Action dated Oct. 3, 2019", 10 pgs.
"U.S. Appl. No. 16/298,721, Response filed Apr. 23, 2020 to Final Office Action dated Mar. 6, 2020", 11 pgs.
"U.S. Appl. No. 16/298,721, Response filed Oct. 22, 2020 to Non Final Office Action dated Jul. 24, 2020", 13 pgs.
"KR 10-0853122 B1 machine translation", IP.com, (2008), 29 pgs.
Ohya, Jun. et al., "Virtual Metamorphosis", IEEE MultiMedia, 6(2), (1999), 29-39.
"U.S. Appl. No. 16/298,721, Notice of Allowance dated Nov. 10, 2020", 5 pgs.

\* cited by examiner

METHOD FOR REAL TIME VIDEO PROCESSING INVOLVING CHANGING A COLOR OF AN OBJECT ON A HUMAN FACE IN A VIDEO

CROSS-REFERENCE TO RELATED APPLICATIONS

This application is a continuation of and claims the benefit of priority of U.S. patent application Ser. No. 15/208,973, filed Jul. 13, 2016, which is a continuation of and claims the benefit of priority of U.S. patent application Ser. No. 14/325,477, filed Jul. 8, 2014, which claims the benefit of U.S. Provisional Application No. 61/936,016, filed on Feb. 5, 2014, the benefit of priority of each of which are claimed hereby and each of which are incorporated by reference herein in their entirety.

BACKGROUND OF THE INVENTION

Technical Field

The disclosed embodiments relate generally to the field of real time video processing and, in particular, to a computerized system and computer-implemented method for real time video processing that involves changing color of an object on a face in a video.

Description of the Related Art

Nowadays a variety of programs can provide processing of still images, for example, effects like face thinning, makeup, etc, and processing of real time video using some filters (for example, web cam video). There are also known face tracking algorithms and implementations for videos.

U.S. Patent Application Publication No. US2007268312, incorporated herein by reference, discloses a method of replacing face elements by some components that is made by users for real time video. However, it is not possible to process real time video in such a way that an object shown in real time video can be modified in real time naturally with some effects. In case of a human's face, such effects can include making a face younger/older, applying makeup, removing pigments stains, bruises, blemishes, scars and etc.

On the IMATEST software website (http://www.imatest-.com/) an algorithm for detecting blemishes on a photo is disclosed. According to the developers of IMATEST, the method includes forming linearized picture and detecting so-called pixel error according to average pixel intensity over an area and a prescribed threshold. Though the disclosed algorithm is alike the present invention, it does not allow video processing, and even being applied to a sequence of images (video frames) it would not work efficiently due to successive heavy operations associated with the image preparatory processing for blemish detection. Thus, there is need for a method providing effective and naturally looking blemish detecting and removing.

Thus, new and improved systems and methods are needed that would enable real time video processing that involves changing color of an object on a face of a user in a video.

SUMMARY OF THE INVENTION

The embodiments described herein are directed to systems and methods that substantially obviate one or more of the above and other problems associated with the conventional technology for real time video processing.

In accordance with one aspect of the embodiments described herein, there is provided a computer-implemented method for real time processing of a video for changing a color of an object in the video, the method being performed in connection with a computerized system comprising a processing unit and a memory, the method comprising: providing an object in the video that at least partially and at least occasionally is presented in frames of the video; detecting the object in the video, wherein said detection comprises detecting feature reference points of the object; tracking the detected object in the video, wherein the tracking comprises creating a mesh that is based on the detected feature reference points of the object and aligning the mesh to the object in each frame; generating a set of node points on the created mesh based on a request for changing color, the set of node points defining an area the color of which is to be changed; and transforming the frames of the video in such way that the object's color is changed within the defined area when the object is presented in frames of the video.

In accordance with another aspect of the embodiments described herein, there is provided a computer-implemented method of real time processing of a video for changing color of an object on a face in the video, the method being performed in connection with a computerized system comprising a processing unit and a memory, the method comprising: forming a mesh of the face in the video based on distinguishable points present in most frames of the video; aligning the mesh to the face image in each frame; forming a binary mask providing the pixels to be recolored based on a weighted sum of information from the current frame and information from at least one previous frame; aligning the binary mask to the mesh on each frame; and applying a new colour and a new intensity value to the pixels of each frame that are to be recolored.

In one or more embodiments, the new colour is applied with not full intensity so that the colour is partly opaque.

In one or more embodiments, the new colour and intensity value for the pixels of each frame that are to be recolored are calculated using color and intensity values of a neighbor pixel.

In one or more embodiments, aligning the binary mask to the mesh on each frame comprises: making a projection of a mesh to a regular grid to separate the mesh into 100×100 cells by the regular grid; determining the mesh element to which a cell of the grid corresponds to, for each cell; and determining the pixel corresponding to each of the determined mesh elements.

In one or more embodiments, determining the pixel corresponding to each of the determined mesh elements is performed using a breadth-first-search.

In one or more embodiments, making a projection of a mesh to the grid is performed once and steps of determining the mesh element and determining the pixel corresponding to each of the determined mesh elements are performed for each frame.

In one or more embodiments, forming a binary mask providing the pixels to be recolored comprises: dividing the mesh into at least 1600 cells by a grid; scanning each frame by a square pixel region, wherein the size of the square pixel region in pixels is determined from the width of an eye in pixels; determining the mean gray-value intensity of each scanned square of the frame; detecting pixels to be recolored by comparing the gray-value intensity of each pixel with the mean value of the square it belongs to and by marking the pixels that have the intensity at least 0.92 times of the mean intensity value as pixels to be recolored; removing a region from the mesh around the pixels to be recolored, wherein the region is a circle having a center on a pixel marked as a pixel to be recolored and a radius as a linear function of the eye width; applying binary morphological closing to the plurality of marked pixels, wherein the binary morphological closing comprises morphological dilation and morphological erosion applied with a radius determined from the width of eye in pixels; and removing small and large regions of the pixels to be recolored from the mesh, wherein the regions with an area less than $R^2*0.2$ are detected as small and the regions with an area more than $R^2*8$ are detected as large, wherein R is the radius of binary morphological operations and each region is a four-connected component.

In one or more embodiments, removing small and large regions of the pixels to be recolored is performed using breadth-first-search.

In accordance with yet another aspect of the embodiments described herein, there is provided a mobile computerized system comprising a processing unit and a memory, the memory storing instructions for: forming a mesh of the face in a video based on distinguishable points present in most frames of the video; aligning the mesh to the face image in each frame; forming a binary mask providing the pixels to be recolored based on a weighted sum of information from the current frame and information from at least one previous frame; aligning the binary mask to the mesh on each frame; and applying a new colour and a new intensity value to the pixels of each frame that are to be recolored.

In one or more embodiments, the new colour is applied with not full intensity so that the colour is partly opaque.

In one or more embodiments, the new colour and intensity value for the pixels of each frame that are to be recolored are calculated using color and intensity values of the neighbor pixel.

In one or more embodiments, forming a mask for each frame by aligning the mask to the mesh on each frame comprises the following steps: making a projection of a mesh to a regular grid to separate the mesh into 100×100 cells by the regular grid; determining the mesh element to which a cell of the grid corresponds to, for each cell; and determining the pixel corresponding to each of the determined mesh elements.

In one or more embodiments, determining the pixel corresponding to each of the determined mesh elements is performed using a breadth-first-search.

In one or more embodiments, making a projection of a mesh to the grid is performed once and steps of determining the mesh element and determining the pixel corresponding to each of the determined mesh elements are performed for each frame.

In one or more embodiments, forming a binary mask providing the pixels to be recolored comprises the following steps: dividing the mesh into at least 1600 cells by a grid; scanning each of the frames by a square pixel region, wherein the size of the square pixel region in pixels is determined from the width of an eye in pixels; determining the mean gray-value intensity of each scanned square of the frame; detecting pixels to be recolored by comparing the gray-value intensity of each pixel with the mean value of the square it belongs to and by marking the pixels that have the intensity at least 0.92 times of the mean intensity value as pixels to be recolored; removing a region from the mesh around the pixels to be recolored, wherein the region is a circle having a center on a pixel marked as a pixel to be recolored and a radius as a linear function of the eye width; applying a binary morphological closing to the plurality of marked pixels, wherein the binary morphological closing comprises morphological dilation and morphological erosion applied with a radius determined from the width of eye in pixels; removing small and large regions of the pixels to be recolored from the mesh, wherein the regions with an area less than $R^2*0.2$ are detected as small and the regions with an area more than $R^2*8$ are detected as large, wherein R is radius of binary morphological operations and each region is a four-connected component.

In one or more embodiments, removing small and large regions of the pixels to be recolored is performed using breadth-first-search.

In accordance with yet another aspect of the embodiments described herein, there is provided a device capable of video processing comprising a processing unit and a memory, the memory storing instructions for: forming a mesh of the face in a video based on distinguishable points present in most frames of the video; aligning the mesh to the face image in each frame; forming a binary mask providing the pixels to be recolored based on a weighted sum of information from the current frame and information from at least one previous frame; aligning the binary mask to the mesh on each frame; and applying a new colour and a new intensity value to the pixels of each frame that are to be recolored.

In one or more embodiments, the new colour is applied with not full intensity so that the colour is partly opaque.

In one or more embodiments, the new colour and intensity value for the pixels of each frame that are to be recolored are calculated using color and intensity values of the neighbor pixel.

In one or more embodiments, forming a mask for each frame by aligning the mask to the mesh on each frame comprises the following steps: making a projection of a mesh to a regular grid to separate the mesh into 100×100 cells by the regular grid; determining the mesh element to which a cell of the grid corresponds to, for each cell; and determining the pixel corresponding to each of the determined mesh elements.

In one or more embodiments, determining the pixel corresponding to each of the determined mesh elements s performed using a breadth-first-search.

In one or more embodiments, making a projection of a mesh to the grid is performed once and steps of determining the mesh element and determining the pixel corresponding to each of the determined mesh elements are performed for each frame.

In one or more embodiments, forming a binary mask providing the pixels to be recolored comprises: dividing the mesh into at least 1600 cells by a grid; scanning each of the frames by a square pixel region, wherein the size of the square pixel region in pixels is determined from the width of an eye in pixels; determining the mean gray-value intensity of each scanned square of the frame; detecting pixels to be recolored by comparing the gray-value intensity of each pixel with the mean value of the square it belongs to and by marking the pixels that have the intensity at least 0.92 times of the mean intensity value as pixels to be recolored; removing a region from the mesh around the pixels to be recolored, wherein the region is a circle having a center on a pixel marked as a pixel to be recolored and a radius as a linear function of the eye width; applying a binary morphological closing to the plurality of marked pixels, wherein the binary morphological closing comprises morphological dilation and morphological erosion applied with a radius determined from the width of eye in pixels; removing small and large regions of the pixels to be recolored from the mesh, wherein the regions with an area less than $R^2*0.2$ are detected as small and the regions with an area more than $R^2*8$ are detected as large, wherein R is radius of binary morphological operations and each region is a four-connected component.

In one or more embodiments, removing small and large regions of the pixels to be recolored is performed using a breadth-first-search.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
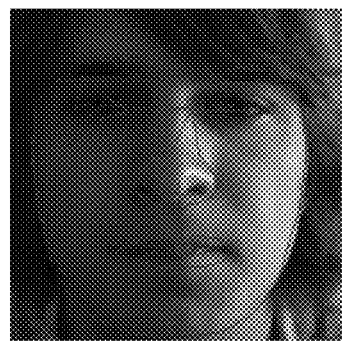
FIG. 1 illustrates facial feature reference points detected by an ASM algorithm used in the method according to one embodiment of the present invention.
Figure 1:
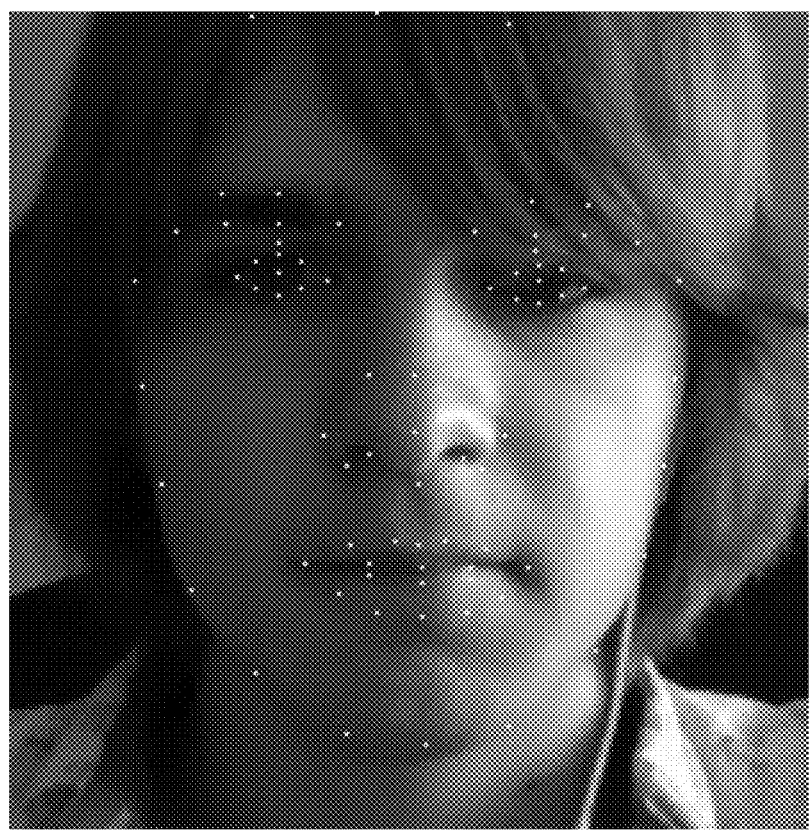

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

It will be appreciated that the method for real time video processing can be performed with any kind of video data, e.g. video streams, video files saved in a memory of a computerized system of any kind (such as mobile computer devices, desktop computer devices and others), and all other possible types of video data understandable for those skilled in the art. Any kind of video data can be processed, and the embodiments disclosed herein are not intended to be limiting the scope of the present invention by indicating a certain type of video data.

Face Detection and Initialization

The embodiments disclosed further are aimed for processing of video streams, however all other types of video data including video files saved in a memory of a computerized system can be processed by the methods of the present invention. For example, a user can load video files and save them in a memory of his computerized system and such video files can be also processed by the methods of the present invention. In one or more embodiments, the face is detected on an image using Viola-Jones method well known to persons of ordinary skill in the art. The aforesaid Viola-Jones method is a fast and quite accurate method used to detect the face region. Then, an Active Shape Model (ASM) algorithm is applied to the face region of an image to detect facial feature reference points. However, it should be appreciated that other methods and algorithms suitable for face detection may be used.

In one or more embodiments, facial feature reference point can be acquired using the algorithm described in a publication "Locating Facial Features with an Extended Active Shape Model by Milborrow", S., Nicolls, F. In: Forsyth, D., Torr, P., Zisserman, A. (eds.) ECCV 2008, Part IV. LNCS, vol. 5305, pp. 504-513. Springer, Heidelberg (2008), incorporated herein by reference.

In or more embodiments, mapping can be built from facial feature reference points, detected by ASM, to Candide-3 point, and that gives us Candide-3 points x and y coordinates. Candide is a parameterized face mask specifically developed for model-based coding of human faces. Its low number of polygons (approximately 100) allows fast reconstruction with moderate computing power. Candide is controlled by global and local Action Units (AUs). The global ones correspond to rotations around three axes. The local Action Units control the mimics of the face so that different expressions can be obtained.

The following equation system can be made, knowing Candide-3 points x and y coordinates.

$$\sum_{j=1}^{m} X_{ij} * B_j = x_i, \quad (1)$$

$$\sum_{j=1}^{m} Y_{ij} * B_j = y_i, \quad (2)$$

where Bj—j-th shape unit, xi, yi—i-th point coordinates, Xij, Yij—coefficients, which denote how the i-th point coordinates are changed by j-th shape unit. In this case, this system is over-determined, so it can't be solved precisely, so we minimize $$\left(\sum_{j=1}^{m} X_{ij} * B_j - x_i\right)^2 + \left(\sum_{j=1}^{m} Y_{ij} * B_j - y_i\right)^2 \to \min. \quad (3)$$

Let's denote $X=((X_{ij})^T,(Y_{ij})^T)^T, x=((x_i)^T,(y_i)^T)^T,$
$B=(B_j)^T.$ (4)

This equation system is linear, therefore its solution is $$B=(X^TX)^{-1}X^Tx. \quad (5)$$

In one or more embodiments, it is also possible to use Viola-Jones method and ASM to improve tracking quality. Face tracking methods usually accumulate error over time, so they can lose face position after several hundred frames. In order to prevent it, in the present invention the ASM algorithm is run from time to time to re-initialize tracking algorithm.

Face Tracking

Figure 2:
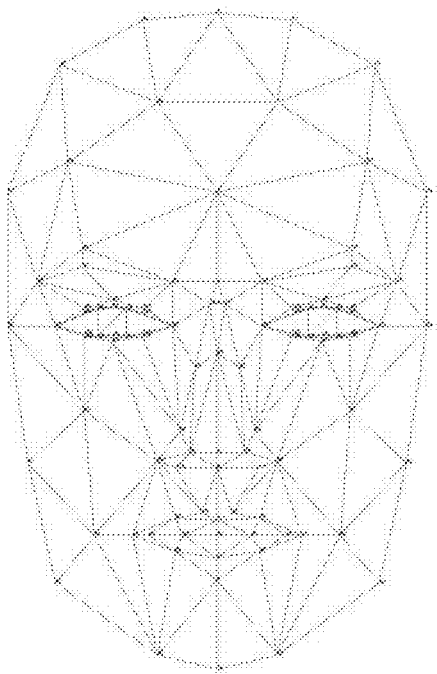
FIG. 2 illustrates Candide-3 model used in the method according to one embodiment of the present invention.

As it was mentioned above, in the present invention Candide-3 model is used (see Ahlberg, J.: Candide-3, an updated parameterized face. Technical report, Linköping University, Sweden (2001), incorporated herein by reference) to track face during video stream, it is shown in FIG. 2.

Figure 3A:
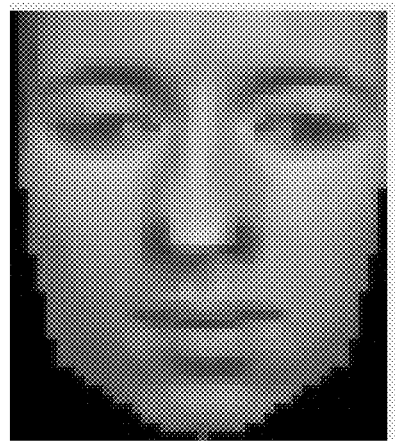
FIG. 3(a) and FIG. 3(b) show an example of a mean face (a) and an example of current observation.
Figure 3B:
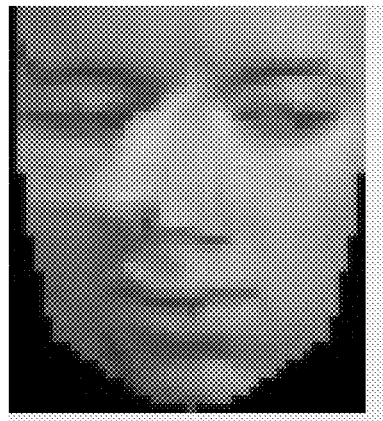
Figure 4:
FIG. 4 illustrates Candide at a frame used in the method according to one embodiment of the present invention.

In one or more embodiments, a state of the model can be described by shape units intensity vector, action units intensity vector and a position-vector. Shape units are some main parameters of a head and a face, in the present invention the following 10 units are used:

Eyebrows vertical position
Eyes vertical position
Eyes width
Eyes height
Eye separation distance
Nose vertical position
Nose pointing up
Mouth vertical position
Mouth width
Chin width In one or more embodiments, action units are face parameters that correspond to some face movement, in the present invention following 7 units are used:

Upper lip raiser
Jaw drop
Lip stretcher
Left brow lowerer
Right brow lowerer
Lip corner depressor
Outer brow raiser In one or more embodiments, the mask position at a picture can be described using 6 coordinates: yaw, pitch, roll, x, y, scale. The main idea of the algorithm proposed by Dornaika et al. (Dornaika, F., Davoine, F.: On appearance based face and facial action tracking. IEEE Trans. Circuits Syst. Video Technol. 16(9):1107-1124 (2006), incorporated herein by reference) is to find the mask position, which observes the region most likely to be a face. For each position it is possible to calculate the observation error—the value which indicates the difference between image under current mask position and the mean face. An example of the mean face and of the observation under current position is illustrated in FIGS. 3(a)-3(b). FIG. 3(a) corresponds to the observation under the mask shown in FIG. 4.

In one or more embodiments, face is modeled as a picture with a fixed size (width=40 px, height=46 px) called a mean face. Gaussian distribution that is proposed in original algorithms has shown worse result in compare with a static image. So the difference between current observation and a mean face is calculated in the following way:

$$e(b)=\Sigma(\log(1+I_m)-\log(1+I_i))^2 \quad (6)$$

Logarithm function makes tracking more stable.

In one or more embodiments, to minimize error we use Teylor series as it was proposed by Dornaika at. el. (see Dornaika, F., Davoine, F.: On appearance based face and facial action tracking. IEEE Trans. Circuits Syst. Video Technol. 16(9):1107-1124 (2006)). It was found that it is not necessary to sum up a number of finite differences when calculating an approximation to the first derivative. We use $$g_{ij} = \frac{W(y_t, b_t + \delta b_t)_{ij} - W(y_t, b_t + \delta b_t)_{ij}}{\delta_j}$$

to calculate the derivative. Here $g_{ij}$ is an element of matrix G. This matrix has size m*n, where m is large enough (about 1600) and n is small (about 14). If we had calculate ii straight-forward we would have to do n*m operations of division. To reduce the number of divisions we can rewrite this matrix as a product of two matrices:

$$G=A*B$$

Where matrix A has the same size as G and its element is:

$$a_{ij}=W(y_t,b_t+\epsilon b_t)_{ij}-W(y_t,b_t-\delta b_t)_{ij} \quad (7)$$

and matrix B is a diagonal matrix with sizes n*n, and $$b_{ij}=\delta_i^{-1} \quad (8)$$

Now we need to obtain Matrix $G_t^+$ and here is a place where we can reduce a number of divisions.

$$G_t^+=(G^TG)^{-1}G^T=(B^TA^TAB)^{-1}B^TA^T=B^{-1}(A^TA)^{-1}B^{-1}BA^T=B^{-1}(A^TA)^{-1}A^T \quad (9)$$

In one or more embodiments, after that transformation this can be done with n*n divisions instead of m*n.

One more optimization was used here. If we create matrix $G_t^+$ and then multiply it to $\Delta b_t$, we will have to do $n^2m$ operations, but if we first multiply $A^T$ and $\Delta b_t$, then $B^{-1}$ $(A^TA)^{-1}$ with it, we will do only $n*m+n^3$ operations, which is much much better because n<<m.

It should be noted that to increase tracking speed in the present invention the multiplication of matrices is performed in such a way, that it can be boosted using ARM advanced SIMD extensions (also known as NEON). Also, the GPU is used instead of CPU whenever possible. To get a high performance of the GPU, operations in the present invention are grouped in a special way.

Thus, tracking according to an embodiment of the present invention has the following distinguishing features:
1. Before tracking Logarithm is applied to grayscale the value of each pixel to track it. This transformation has a great impact to tracking performance
2. In the procedure of gradient matrix creation, the step of each parameter depends on the scale of the mask.

The following disclosure relates to a particular embodiment of the proposed method. Though the exemplary embodiment is aimed on removing blemishes, the described technique can also be efficiently applied for creating make-up or changing skin tone.

Removing Blemishes

Figure 5A:
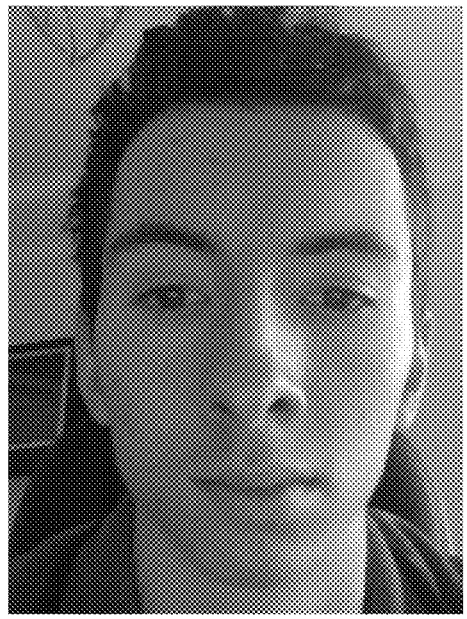
FIG. 5(a) and FIG. 5(b) show a frame before and after blemish removing.
Figure 5B:
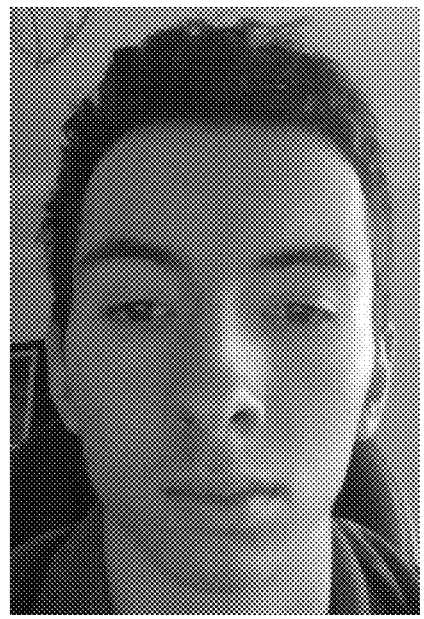

In one or more embodiments, blemish removal filter detects blemishes on a face and removes them. FIG. 5(a)-5(b) show the result of applying that filter according to one of the embodiments.

Filter according to one of the embodiments consists of two main parts: blemish region detection and blemish removal. The net model is used to detect blemishes: in one of the embodiments normal Candide-3 projection was separated into 100×100 cells by a regular grid. Each cell contains probability that there is a blemish at the corresponding point at a face. So each cell contains value from 0.0 to 1.0.

In one or more embodiments, each frame updates the blemish model by adding new information. At current frame, blemish region is detected in the following way:
1) Applying Adaptive Binarization.
A frame is scanned using square with sides equal to eye width (in pixel) divided by 2. In each square with central pixel p mean gray-value intensity $m_p$ is calculated. Pixel marked as blemish-pixel if its intensity $I_p$ satisfies the condition:

$$\frac{I_p}{m_p} < 0.93 \tag{10}$$

2) Removing Small Region.

$$R = \frac{\text{eye width} + 13}{14} \tag{11}$$

Breadth-first-search is used to remove all 8-connected components of pixel marked as blemish with a size less than $$R*R*0.3 \tag{12}$$

3) Binary Morphological Closing.
In one or more embodiments, after removing small region, morphological closing is applied to the left image (image with marked pixels) using circle Structure Element with radius equal to R for dilation and radius equal to 0.5*R for erosion.
4) Removing Small and Large Regions.
3. After all steps 1)-3) regions (or so-called connected components, in some embodiments four-connected components) with a size (area) less than R*R*0.2 or greater than R*R*8 are removed using breadth-first-search.
At the end of this process we've got some binary mask, where 1 indicates blemish-pixel. A binary mask is a matrix, where regions with blemishes are filled with 1, and others are filed with 0. In particular embodiments, relating to removing blemishes from a face image on a video the regions are detected using adaptive binarisation of the red channel. Then the model is updated with this mask in the following way:
for each cell i, probability that there is a blemish is recalculating using the following formula:

$$p_i^t = (1-\alpha)p_i^{t-1} + \alpha * \text{mask}_i \tag{13}$$

where $p_i^t$—probability of finding a blemish at pixel i after frame number t.
$\text{mask}_i$—value of pixel i on the last mask $$\alpha = 1 - \exp(-\log(2.0)/\text{halfLife}) \tag{14}$$

$$\text{halfLife} = 20 \tag{15}$$

Figure 6:
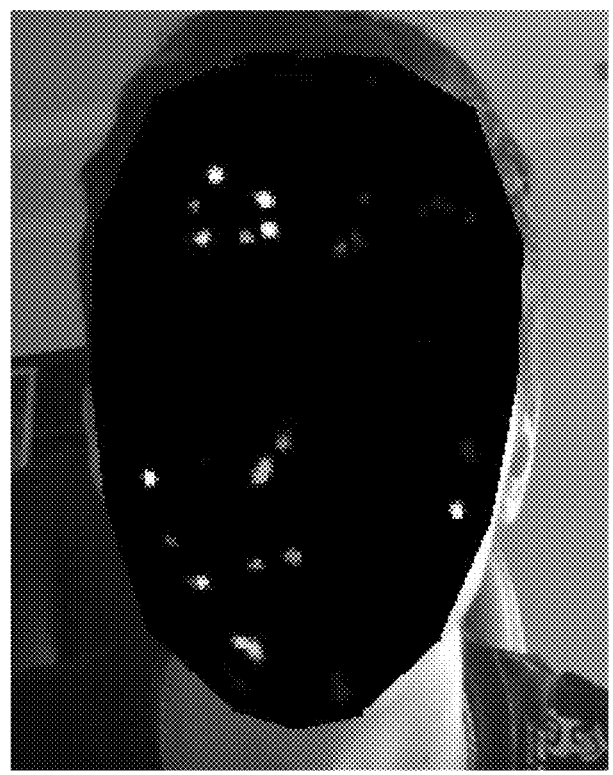
FIG. 6 shows a binary mask that depicts pixels to be recolored.

Visualization of the model can be found in FIG. 6 Light regions that correspond to the high probability of blemish location.

In one or more embodiments, after model updating, blemishes are removed using the following method:
First of all, mapping from each pixel of the face region to cells of the model should be built. To increase performance it is done in the following way:
1) Make an orthogonal project of candide-3 to the 100×100 grid
2) For each cell find a triangle it lies in.
3) Compute barycentric coordinates
4) Find corresponding pixel for each cell in the model
5) Write down the cell coordinates to the found pixel
6) Write down coordinates contains in the nearest found pixel, for each pixel that wasn't found at the step 5. Use breadth-first-search to make it efficiently.

Steps 1-3 may be performed only once, at the initialization part. In other words, only steps 4-6 have to be performed in each frame. So, the pixels to be recolored are detected based on a weighted sum of information about a value of each pixel of the mask from the current frame and information about a value of each pixel of the mask from at least one previous frame: if $I_0$ is intensity of a pixel of a previous mask and $I_1$ is intensity of a current one, that weighted sum here is $I_0 \cdot \alpha + (1-\alpha) \cdot I_1$.

For each pixel at the face region, except pixels that correspond to eyes and mouth locations, its new value is calculated using the following formula:

$$f_i^t = l_i^t * (1 - p_i^t) + r_i^t * p_i^t \tag{16}$$

where $l_i^t$ is pixel i intensity at frame t,
$r_i^t$ is the mean value of 4 neighbor pixels at the distance dist,
dist=1.5*R,
$f_i^t$ is the filtered pixel value.

Exemplary Computer Platform

Figure 7:
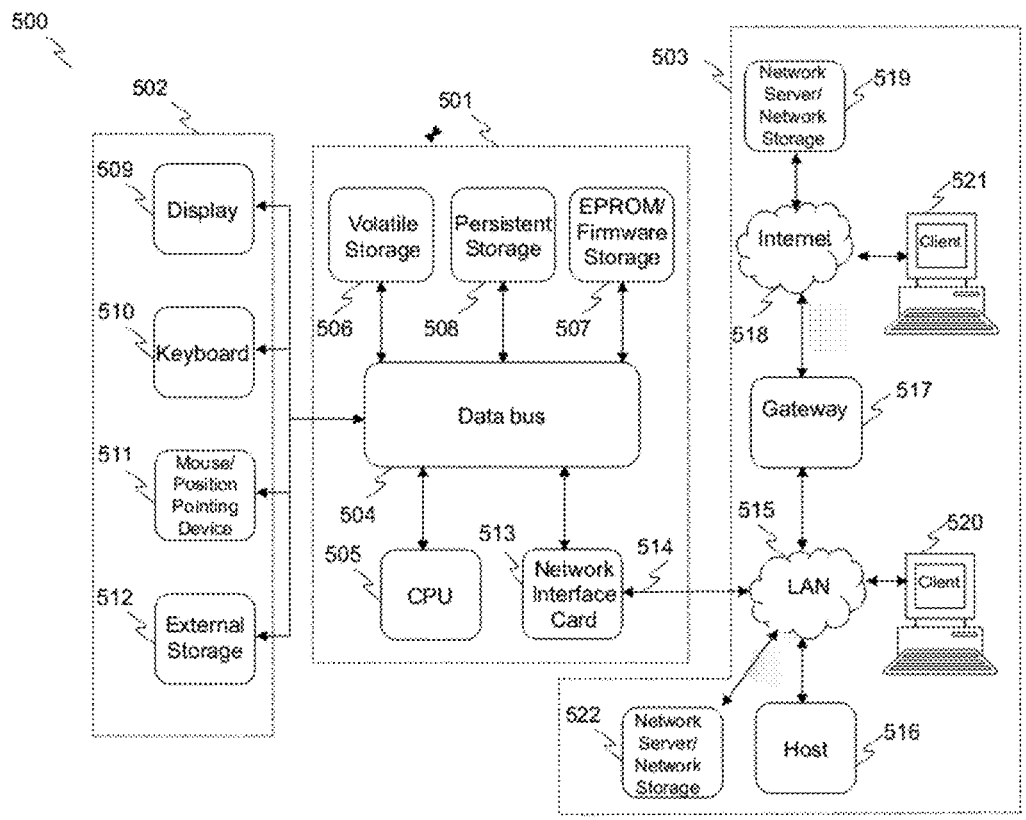
FIG. 7 illustrates an exemplary embodiment of a computer platform based on which the techniques described herein may be implemented.

FIG. 7 is a block diagram that illustrates an embodiment of a computer system 500 upon which various embodiments of the inventive concepts described herein may be implemented. The system 500 includes a computer platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505, including the software application for implementing multifunctional interaction with elements of a list using touch-sensitive devices described above. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 501 may be coupled via bus 504 to a touch-sensitive display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505. Another type of user input device is cursor control device 511, such as a mouse, a trackball, or cursor direction keys for communicating direction information and command selections to processor 505 and for controlling cursor movement on touch-sensitive display 509. This input device typically has two degrees of freedom in two axes, a first axis (e.g., x) and a second axis (e.g., y), that allows the device to specify positions in a plane. To detect user's gestures, the display 509 may incorporate a touchscreen interface configured to detect user's tactile events and send information on the detected events to the processor 505 via the bus 504.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 514 typically provides data communication through one or more networks to other network resources. For example, network link 514 may provide a connection through local network 515 to a host computer 516, or a network storage/server 522. Additionally or alternatively, the network link 514 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through the Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real time video processing. It is intended that the specification and examples be considered as exemplary only, with a true scope and spirit of the invention being indicated by the following claims.

What is claimed is:

1. A computer-implemented method comprising:
identifying, by one or more processors, one or more pixels to be recolored within an object depicted in an image, the one or more pixels are within a region having a prespecified shape, wherein identifying the one or more pixels to be recolored includes determining an intensity value of the one or more pixels to be recolored relative to an intensity value of a pixel at a center of the region;
computing, by the one or more processors, a new pixel value as a function of intensity values of a collection of pixels within the region that is within a given distance of the one or more pixels to be recolored; and
modifying, by the one or more processors, at least a portion of the image by applying the new pixel value to the one or more pixels to be recolored.

2. The method of claim 1 further comprising identifying a face within a set of images comprising a video stream, the set of images including the image.

3. The method of claim 2, wherein the object depicted in the image is depicted on the face, wherein the modifying comprises transforming at least a portion of the set of images to generate a modified video stream by applying the new pixel value to the one or more pixels to be recolored of each image of the video stream while the object is presented within the set of images of the video stream.

4. The method of claim 1 further comprising determining that the intensity value of the one or more pixels, in the region, to be recolored is less than a fraction of the intensity value of the pixel at the center of the region.

5. The method of claim 1, wherein identifying the one or more pixels to be recolored comprises computing a probability that a target object to be recolored within the one or more pixels exists after a given frame number of a plurality of frames, and wherein the new pixel value is further computed as a function of the computed probability.

6. The method of claim 1 further comprising generating a set of node points on a mesh defining one or more areas containing the one or more pixels to be recolored, the new pixel value applied within the one or more areas.

7. The method of claim 1, wherein the image is in a set of images, further comprising:
tracking a face in the set of images; and
applying new color and new intensity value to the one or more pixels to be recolored of each image of the set of images in which the face is tracked.

8. The method of claim 7 further comprising detecting the pixels to be colored within each of the set of images in which the face is tracked based on a weighted sum of information from a current image and information from at least one previous image of the set of images.

9. The method of claim 1, wherein new color and new intensity values are calculated based on one or more color and intensity values of the object, further comprising changing a color of a first portion of the object and maintaining a color of a second portion of the object.

10. A system comprising:
one or more processors; and
a processor-readable storage device coupled to the one or more processors, the processor readable storage device storing processor executable instructions that, when executed by the one or more processors, cause the one or more processors to perform operations comprising:
identifying one or more pixels to be recolored within an object depicted in an image, the one or more pixels are within a region having a prespecified shape, wherein identifying the one or more pixels to be recolored includes determining an intensity value of the one or more pixels to be recolored relative to an intensity value of a pixel at a center of the region;
computing a new pixel value as a function of intensity values of a collection of pixels within the region that is within a given distance of the one or more pixels to be recolored; and
modifying at least a portion of the image by applying the new pixel value to the one or more pixels to be recolored.

11. The system of claim 10, wherein the operations further comprise identifying a face within a set of images comprising a video stream, the set of images including the image.

12. The system of claim 11, wherein the object depicted in the image is depicted on the face, wherein the modifying comprises transforming at least a portion of the set of images to generate a modified video stream by applying the new pixel value to the one or more pixels to be recolored of each image of the video stream while the object is presented within the set of images of the video stream.

13. The system of claim 10, wherein the operations further comprise determining that the intensity value of the one or more pixels, in the region, to be recolored is less than a fraction of the intensity value of the pixel at the center of the region.

14. The system of claim 10, wherein identifying the one or more pixels to be recolored comprises computing a probability that a target object to be recolored within the one or more pixels exists after a given frame number of a plurality of frames, and wherein the new pixel value is further computed as a function of the computed probability.

15. The system of claim 10, wherein the operations further comprise:
generating a set of node points on the mesh defining one or more areas containing the one or more pixels to be recolored, the new pixel value applied within the one or more areas.

16. The system of claim 10, wherein the image is in a set of images, and wherein the operations further comprise:
tracking a face in the set of images; and
applying new color and new intensity value to the one or more pixels to be recolored of each image of the set of images in which the face is tracked.

17. The system of claim 16, wherein the operations further comprise:
detecting the pixels to be colored within each frame of the set of images in which the face is tracked based on a weighted sum of information from a current image and information from at least one previous image of the set of images.

18. The system of claim 10, wherein new color and new intensity values are calculated based on one or more color and intensity values of the object within the image, and wherein the operations further comprise changing a color of a first portion of the object and maintaining a color of a second portion of the object.

19. A processor-readable storage device storing processor executable instructions that, when executed by a processor of a machine, cause the machine to perform operations comprising:
- identifying one or more pixels to be recolored within an object depicted in an image, the one or more pixels are within a region having a prespecified shape, wherein identifying the one or more pixels to be recolored includes determining an intensity value of the one or more pixels to be recolored relative to an intensity value of a pixel at a center of the region;
- computing a new pixel value as a function of intensity values of a collection of pixels within the region that is within a given distance of the one or more pixels to be recolored; and
- modifying at least a portion of the image by applying the new pixel value to the one or more pixels to be recolored.

20. The processor-readable storage device of claim 19, wherein the operations further comprise identifying a face within a set of images comprising a video stream, the set of images including the image.

* * * * *

UNITED STATES PATENT AND TRADEMARK OFFICE
CERTIFICATE OF CORRECTION

| | |
|---|---|
| PATENT NO. | : 10,991,395 B1 |
| APPLICATION NO. | : 16/277750 |
| DATED | : April 27, 2021 |
| INVENTOR(S) | : Shaburova et al. |

It is certified that error appears in the above-identified patent and that said Letters Patent is hereby corrected as shown below:

On the Title Page

Item [56], on page 5, in Column 1, under "Other Publications", Line 1, delete "Sep." and insert --Apr.-- therefor Signed and Sealed this
Fifth Day of October, 2021

Drew Hirshfeld
*Performing the Functions and Duties of the
Under Secretary of Commerce for Intellectual Property and
Director of the United States Patent and Trademark Office*